United States Patent [19]

Dale et al.

[11] 4,022,857
[45] May 10, 1977

[54] PRODUCTION OF FOAMED SULFUR COMPOSITIONS

[75] Inventors: John M. Dale; Allen C. Ludwig, both of San Antonio, Tex.

[73] Assignee: Chevron Research Company, San Francisco, Calif.

[22] Filed: Feb. 24, 1975

[21] Appl. No.: 552,012

Related U.S. Application Data

[63] Continuation of Ser. No. 382,598, July 25, 1973, abandoned, which is a continuation-in-part of Ser. No. 281,587, Aug. 17, 1972, abandoned.

[52] U.S. Cl. .................................. 264/42; 106/70
[51] Int. Cl.² .................. C04B 33/04; B29H 7/20
[58] Field of Search ............... 264/42, 54; 106/70, 106/122, 287 SC

[56] References Cited

UNITED STATES PATENTS 3,337,355  8/1967  Dale et al. .................. 264/42

Primary Examiner—Robert F. White
Assistant Examiner—John Parrish
Attorney, Agent, or Firm—Dix A. Newell; John Stoner, Jr.; W. Keith Turner

[57] ABSTRACT

Sulfur-based foams are produced by heating to liquid state a sulfur formulation containing a minor amount of a gas-producing component in a first (molten) zone; passing the mixture maintained in liquid form to a second (mixing) zone where it is mixed with a foaming agent which in combination with the gas-produced compound releases gas, and the gas-containing mixture is passed from the second zone for use as a cellular construction material. Apparatus for carrying out the process is provided.

13 Claims, 2 Drawing Figures

PRODUCTION OF FOAMED SULFUR COMPOSITIONS

CROSS-REFERENCE

This application is a continuation of U.S. application Ser. No. 382,598, filed July 25, 1973, now abandoned which, in turn, is a continuation-in-part of commonly assigned U.S. application Ser. No. 281,587, filed Aug. 17, 1972, now abandoned.

BACKGROUND OF THE INVENTION

This invention relates to the continuous production of foamed sulfur compositions.

U.S. Pat. No. 3,337,355 covers a method of producing sulfur foams which comprises generally the steps of heating elemental sulfur to above its melting point, blending a stabilizing agent and a viscosity increaser into the molten sulfur and forming bubbles in the molten sulfur and cooling it below its melting point. Bubble formation is accomplished by introducing into the sulfur containing the viscosity increaser and stabilizer a quantity of a foaming agent such as a mixture of phosphoric acid and sodium carbonate or an organic foaming agent such as N,N'-dinitrosopentamethylene tetramine. In the illustrated production of foam the foaming agent is introduced into the modified molten sulfur in a vessel and the resulting foam is passed from the vessel through a conduit and deposited where desired.

While this method of forming sulfur foam may be suitable for batch applications and those applications in which portability of the apparatus is not important, in certain applications where it is desired that the process be continuous and/or that the apparatus be movably mounted to deposit a continuous layer of foam as, for example, from a constantly moving truck, it is desirable that the blending of the molten sulfur with the viscosity improver and the stabilizer be separated from the addition of the foaming agent.

It is also desirable to apply a continuous process to the generation of other sulfur based foams such as those illustrated by those described in commonly assigned U.S. patent application Ser. Nos. 253,144 and 344,694, which employ as the basic foaming materials mixtures of sulfur and ring hydroxy or ring amino-substituted aromatic polysulfides. The mixtures are foamed and cross-linked by the addition of an organic acid, preferably a carboxylic acid, and a polyisocyanate or polyisothioxyanate. Since the aromatic polysulfide contains hydroxy or amino groups which will react with isocyanates, prior addition of the acid to the molten sulfur-aromatic polysulfide mixture is required. Additionally, in many cases, the acids which are employed are incorporated into the polysulfide chains; and when polyisocyanate is added, the reaction produces $CO_2$ (or COS with polyisothiocyanates) causing foam formation, and the reaction of the carboxyl and isocyanate groups gives additional polymer cross-linking by amide formation (in addition to the urethane or ureido formation with the hydroxyl and amino groups of the polysulfide).

SUMMARY OF THE INVENTION

A method is provided for the continuous production of sulfur-based foams. Molten sulfur is mixed with additives necessary for the production of stable foams which provide proper viscosity and stability properties. These materials may be mixed with the liquefied sulfur in molten form, or may be melted concurrently with the sulfur. A minor amount of a gas-producing component is introduced into the mixture to form the sulfur formulation. The formulation may be maintained in molten form or may be cooled and solidified and transferred to the foaming apparatus. In the foaming process, the formulation which contains at least 50% by weight sulfur and a minor amount of a gas-producing component is heated in a first zone to a liquid state at a temperature of 100° to 150° C. The formulation is transferred in liquid state to a second zone maintained in the same temperature range where it is mixed with a foaming agent which in combination with the gas-producing component produces gas. The gas-containing mixture is then passed from the second zone at a rate such that the average residence time of the formulation in said second zone is sufficient to produce gas, usually between about 0.1 and 3.0 seconds. The mixture is then deposited where desired and allowed to cool. A short time at ambient temperature will cause solidification of the foam into a rigid, stable construction material. It may thus be deposited in building forms, directly upon the ground where construction pallets are needed, or may be placed, for example, directly on the roofs of dwellings and other similar structures to provide insulation or, in boat hulls, to provide flotation and other similar uses.

DESCRIPTION OF THE PREFERRED EMBODIMENTS

Figure 1:
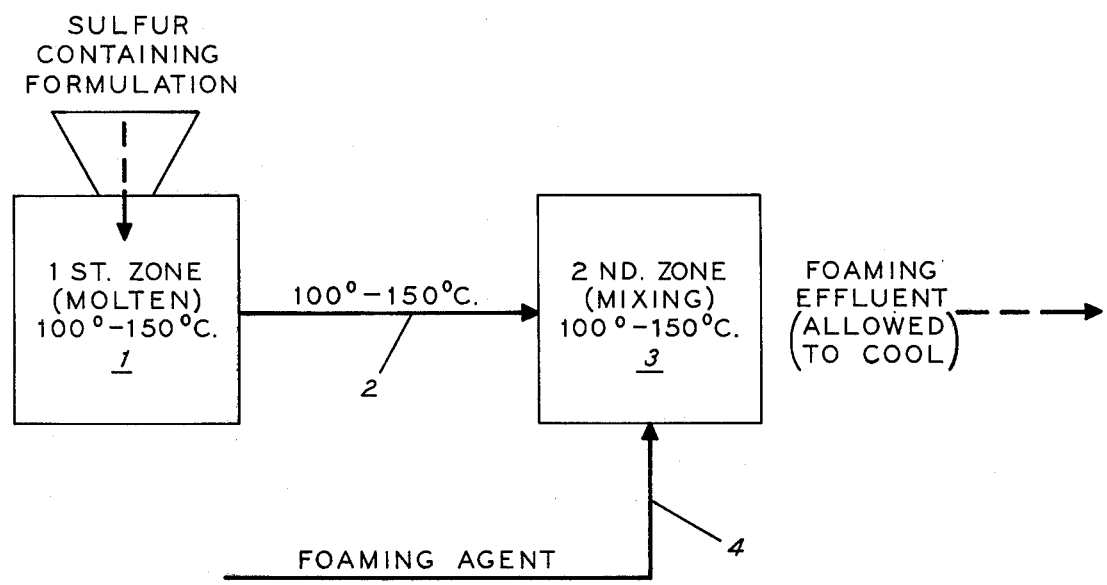

In one embodiment of the invention, the molten sulfur formulation is passed from the first zone through a discharge line into the second zone (a dynamic mixer) wherein the foaming agent is rapidly by dynamic means such as mechanical power stirrer, shaking, agitating with inert gas such as nitrogen, etc., and thoroughly blended into the mixture, and the resulting foam is discharged to be deposited where desired.

In another embodiment, the molten sulfur formulation is passed from the first zone to a second zone comprising a static mixer where the foaming agent is introduced and where the material passing by stationary baffle plates completes the mixing necessary for foaming.

The gas-producing components employed with the materials of the type described in U.S. Pat. No. 3,337,355 are inorganic sulfides, usually metal sulfides. Included are the alkali metal (Group I$a$) sulfides such as lithium sulfide, sodium sulfide, potassium sulfide; the alkaline earth metal (Group II$a$) sulfides such as magnesium sulfide, calcium sulfide, strontium sulfide, barium sulfide; Group II$b$ sulfides including zinc sulfide; Group III$a$ sulfides including boron sulfide, aluminum sulfide scandium sulfide, etc.; transition metal sulfides including manganese sulfide, iron sulfides, cobalt sulfide, etc.; and Group v$b$ sulfides including phosphorus sulfides, arsenic sulfides, antimony sulfides, and bismuth sulfide, etc. Phosphorus sulfides are preferred. Phosphorus sulfides may be produced in situ by the introduction of elemental phosphorus into the molten formulation. Various of the other sulfides may be produced in this manner. The sulfides are incorporated in the amount of from about 0.1 to 2.0 mols per 100 mols of sulfur in the formulation.

The foaming agents which are employed with the process related to U.S. Pat. No. 3,337,355 are proton donors which includes those materials which are capable of providing a proton or protons under the reaction conditions of the second zone, i.e., temperature of 100° to 150° C to react with the sulfides to form H₂S. Examples of suitable proton donors are conventional inorganic protonic acids such as phosphoric, phosphorous, hydrochloric, sulfuric, nitric, etc.; organic protonic acids such as formic, acetic, propionic, benzoic, etc., and other materials which function as proton donors including water, phenol, and alcohols, etc. With many of the gas-producing sulfides the proton donor should have an acid strength at least equal to that of water, and usually a strength such that a 1 molar aqueous solution will have a pH of 3 or less.

With other sulfides, such as boron sulfide, aluminum sulfide, phosphorus sulfide, etc., water preferably introduced in vapor form as steam is the preferred foaming agent because of its low cost and effectiveness.

The amount of foaming agent employed will be sufficient to provide protons in such quantity as to allow conversion of the sulfur in the sulfide gas-producing component to hydrogen sulfide, preferably, at least a stoichiometric amount relative to the sulfide. Steam is the preferred foaming agent. Steam particularly in combination with $P_2S_5$ accomplishes the production of $H_2S$ from the sulfides to produce an especially uniform, fine-celled foam.

The foaming agents which are employed in producing the sulfur-aromatic polysulfide based foams are polyisocyanates or polyisothiocyanates of the formula $R(NCX)_n$, in which R is a polyvalent organic radical, X is a chalcogen having a molecular weight less than 33, and $n$ is an integer of at least 2. The gas in the case of these foaming agents is $CO_2$ or COS. These materials are employed in sufficient quantity (i.e., added to the molten formulation in the second zone) to provide a sufficient number of isocyanate (or isothiocyanate) groups to react with at least 10%, preferably 50%, and most preferably with about 100% of the acid group present.

It is, in addition, preferred that enough isocyanate groups be provided to react with other functional groups which may be present, including amino and hydroxyl groups.

The foam stabilizing additive combinations which will be employed thus vary according to the basic type of foam produced. In the case of the foams related to those disclosed in U.S. Pat. No. 3,337,355, foam stabilizing agents are those that are described in the patent as viscosity increasers or as stabilizing agents. Viscosity increasers which are described as any of those materials which, when added to molten sulfur, increase the viscosity of the molten sulfur below the transition temperature are added. Included among these materials are phosphorus, arsenic, antimony and phosphorus sulfides. It will be noted that these materials perform a dual function in the process of this invention, providing foam stabilization as well as gas production for foaming when contacted with a proton donor. A second group of materials may be used which tend to increase the viscosity of sulfur below its normal transition temperature but eliminates most of the viscosity increase above the normal transition temperature. These materials include styrene monomer, ethylene disulfide, polysulfide rubbers such as the "Thiokols". The other material blended with the sulfur in producing the foam precursor is described in the patent as a "stabilizing agent". These materials are finely-divided inert materials having individual particles which are plate-like in form. Examples of these materials are ground mica, aluminum pigment, those classes having plate-like particles such as kaolin or china clay, those talcs having plate-shaped particles, etc. These materials will be termed "plate-like stabilizers". These materials may optionally be included in the aromatic polysulfide based foams.

In the production of foams based upon a sulfur, aromatic-polysulfide mixture, the gas producing components are those described in U.S. patent application Ser. No. 344,694, now U.S. Pat. No. 3,892,686, the teachings of which are incorporated by reference. They include compounds which are represented by an acidic compound of the following types:

1. Acids of the formula

in which Y is:

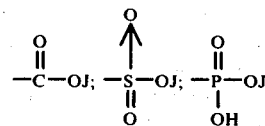

in which J is H or alkyl of 1 to 6 carbon atoms;

in which L is H, hydrocarbyl of 1 to 18 carbon atoms, or is a group the same as the other group attached directly to the phosphorus atom through a carbon-phosphorus bond;

in which J is as previously defined; or

in which Q is H, hydrocarbyl of 1 to 18 carbon atoms, or is a group the same as the other group attached directly to the boron atom through a carbon-boron bond; $R_1$ and $R_2$ are divalent hydrocarbon radicals of 1 to 18 carbon atoms which may be substituted by up to two halogen, hydroxyl, or mercapto groups per radical and may contain from 1 to 3 vinylene or ethynylene groups per radical, M is O, $S_f$ or $-(CH_2)-_f$, $f$ is an integer of 1 to 10, and the sum of the carbon atoms in $R_1$ and $R_2$ is from 2 to 18.

2. Acids of the formula

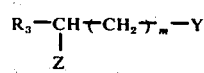

in which Y is as previously described, $R_3$ is H or a hydrocarbyl radical of 1 to 18 carbon atoms which may be substituted by up to two halogen, hydroxyl, or mercapto groups and may contain from 1 to 3 vinylene or ethynylene groups, Z is hydroxy, halogen, or mercapto group or H when $m$ is greater than 0, $m$ is an integer of 0 to 18, and the sum of the carbon atoms in $R_3$ and $-(CH_2)-_m$ is from 1 to 19.

3. Two to five unit addition oligomers of the unsaturated acids of (2.)

4. Unsaturated acids of the formula

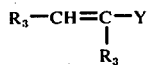

wherein $R_3$ and Y are as previously defined.

5. Two to five unit addition oligomers of the acids of (4).

6. Heterocyclic acids of the formula

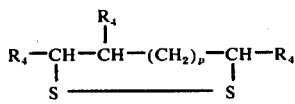

in which $R_4$ is H, Y as previously defined, an aliphatic hydrocarbon radical of 1 to 10 carbon atoms, or an aliphatic hydrocarbon radical of 1 to 10 carbon atoms substituted with acid group Y as previously defined, wherein at least one $R_4$ is a carboxy radical or a substituted aliphatic hydrocarbon radical, and wherein $p$ is 1 or 2.

7. Partially esterified polybasic acids which may contain a hydroxy, mercapto, carboxy, vinylene or ethynylene group, and have an acid equivalent weight (molecular weight divided by the number of free acid groups) within the range of about 100 to about 1,000.

8. Acids of the formula

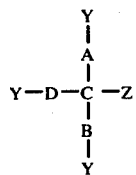

in which Y is as previously defined, A, B, and D are independently $C_nH_m(R_{11})_p(R_{12})_q$, $n$ is an integer 0 to 5, $p$ is an integer 0 to 2, $q$ is an integer 0 to 1, $R_{11}$ is alkyl of 1 to 4 carbon atoms, Z is H, OH, or SH, $m$ is an integer equal to or less than 2n-p-q, $R_{12}$ is OH or SH, and in at least 2 of A, B and D, $n$ is equal to or greater than 1.

9. Acids of the formula $R_{13}Y$ in which Y is as previously defined and $R_{13}$ is a hydrocarbon group of 3 to 24 carbon atoms in which Y is attached to $R_{13}$ through an alicyclic group of 3 to 12 carbon atoms.

10. Acids of the formula

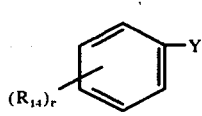

in which Y is as previously defined, $R_{14}$ is SH, an aliphatic hydrocarbon radical of 2 to 24 carbon atoms or a cycloaliphatic hydrocarbon radical of 5 to 20 carbon atoms, and $v$ is an integer 1 to 5. The acids are employed in amounts of from about 0.002 to 0.50 acid equivalents per 100 g. of the sulfur formulation.

Examples of the preferred acids are carboxylic-containing materials of various types described above including dicarboxylic acids such as glutaric, azelaic, etc., thiodipropionic, thiobutanoic, etc., and dithio acids such as dithiodiglycolic, dithiopropionic acids, etc.

Examples of unsaturated acid included alkanoic acids such as acrylic, propargylic, crotonic, etc. Acids of type 2 include chloroacetic, α-chloropropionic, glycolic, lactic, α-mercaptoacetic acid, mercaptopentanoic acids, etc.

Examples of acids of type 4 which have a cyclicdithio structure include 1,2-dithiolane-4-carboxylic acid, 6,8-thioctic acid, etc.

The aromatic precursor such as phenol or aniline may be mixed and reacted directly with molten elemental sulfur to form the aromatic polysulfide. Reaction time is generally from about 1 hour to 24 hours, preferably from about 4 to 12 hours. The temperature of the reaction will be above about 120° C., generally in the range of about 120° to 200° C., with at least 2 mols of sulfur being employed for each mol of the substituted aromatic compound. However, while in situ preparation is possible, it is generally preferred that the polysulfide be prepared and simply blended with molten elemental sulfur either in the first (molten) zone or prior to the introduction into the first zone.

In summary, the foam-stabilizing additives, viscosity increaser, polysulfide or organic acid stabilizing agent, etc. in the sulfur are introduced into the first (molten) zone, which may be a pot or similar vessel equipped with stirring and heating means. As previously mentioned, the materials may be either melted in this zone or may be introduced in premixed molten state. This vessel may be pressurized or open and the molten mixture is then passed by pressure, gravity or be mechanical means, such as a pump, etc., through a suitable line which is either heated or insulated or both, into the second (mixing) zone, which may be a static mixer or a power driven mixer with driven vanes. The foaming agent is preferably introduced into the line first before the mixture passes into the mixing zone. Since the mixture is normally delivered to the second (mixing) zone under pressure, it will be necessary to introduce the foaming agent into the line under pressure at least equal to and preferably greater than that of the molten sulfur. A preferred means of ensuring that the molten mixture reaches the mixing zone at proper pressure is to introduce an inert gas, i.e., one substantially inert to molten sulfur, (i.e., air, nitrogen, etc.) at a pressure equal to or preferably greater than the pressure of the mixture at a point prior to the point where the mixture enters the second mixing zone. After passing through the second (mixing) zone, the foam is deposited upon the desired surface, usually without delay to maintain flowability.

Although not necessary for an understanding of the invention, the attached FIG. I illustrates a typical embodiment of the process of this invention. The sulfur-containing formulation is introduced into the first (molten) zone 1. The formulation is heated until a temperature of 100° to 150° C is reached. This temperature must be sufficient to ensure that the formulation is in liquid form. The mixture is then passed through Line 2, the formulation being maintained in liquid form to the second (mixing) zone 3. The foaming agent is introduced into the second zone 3 through Line 4. The gas-containing effluent is passed from the second (mixing) zone 3 after proper residence time and allowed to cool.

Figure 2:
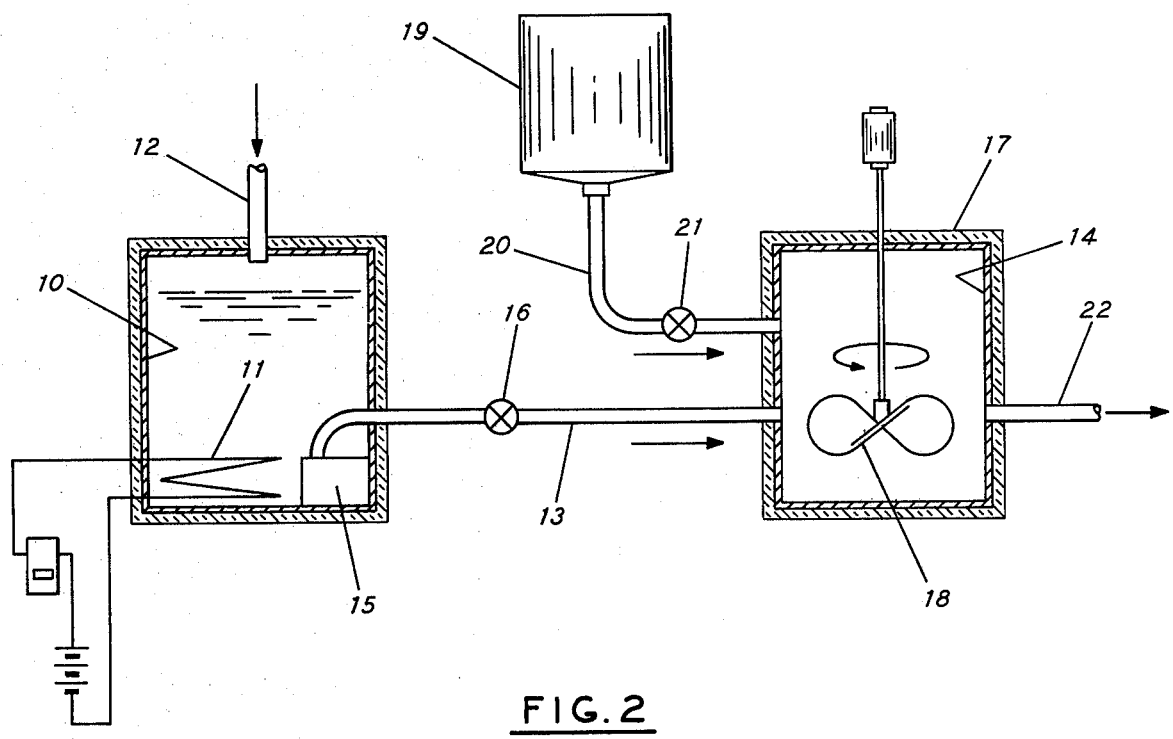

A preferred embodiment of apparatus for producing the sulfur foams of this invention is illustrated in FIG. 2. A first vessel 10 is equipped with a heating means 11 which may, for example, be a temperature controllable electrical heating arrangement which can be controlled to melt a sulfur-containing formulation introduced into the vessel through a conduit 12 and to maintain it in liquid molten form. Conduit means 13 are provided to permit transfer of the liquefied formulation from the first vessel 10 to a second vessel 14. Pressure inducing means, such as a pump 15, are provided to effect the transfer of the liquefied formulation through the conduit means 13 and flow control means, as exemplified by a metering valve 16, is employed to control the flow of the heated liquefied formulation through the conduit 13 to the second vessel 14. Means are provided for maintaining the formulation in a molten condition in the vessel 14. Such means may be, for example, a covering of heat insulating 17. The second vessel is provided with a mixing means, which may be, for example, an electrically driven impeller 18, to intimately mix the formulation with a foaming agent. A container 19 is provided for storage of the foaming agent and is connected by a second conduit means 20 with the vessel 14. The conduit means 20 preferably has associated with it means 21 for controlling the flow of the foaming agent from its container into the second vessel 14.

A discharge means such as conduit 22 is provided for discharging the mixture of heated and liquefied formulation and foaming agent from the second vessel into an environment wherein the ambient temperature is below the melting point of the mixture, permitting the latter to become set to a solid cellular foam-like material.

The following examples illustrate the processes of this invention. The examples are intended to be only illustrative and non-limiting.

EXAMPLE 1 Preparation of Sulfur Foam with Power Mixer with $H_3PO_4$

A 100 lb. portion of elemental sulfur, 10 lb. of talc (Mistron Vapor A), 3 lb. of $P_2S_5$ and 113.0 g. of tricresyl phosphate were plced in a vessel equipped with a power stirrer and pressure tight lid. The mixture was heated with stirring to a temperature of 155° C., a 35 psi pressure was applied to the vessel forcing the molten mixture through an outlet line to a power mixer. Phosphoric acid (the foaming agent) was forced by 55 psi applied pressure through a rotameter into the inlet line at such a rate measured by the rotameter that from about 3 to 5% by weight of acid was mixed with the molten mixture. Foam was ejected from the nozzle of the power mixer which cooled to form a rigid material having uniform small cells. Varying the rate of acid addition (foaming agent) caused the foam density to vary from about 12 to 21 lb/ft³.

EXAMPLE 2 Preparation of Sulfur Foam with Static Mixer

Using the general procedure and apparatus of Example 1 withthe exception that 1 inch diameter static mixer was employed as the second zone mixer, 500 lb. of sulfur, 50 lb. of talc, 25 lb. of $P_2S_5$, 15 lb. of 1,5 cyclooctadiene and 1.25 lb. of tricrecyl phosphate were mixed and with a vessel pressure of 40 psi the mixture was forced through the static mixture with the phosphoric acid. The foaming unit mounted on wheels was moved and the nozzle deposited a uniform layer of foam on the ground which when cooled and solidified had a density of about 15 lb/ft³.

EXAMPLE 3 Preparation of Foam with Water as Foaming Agent

The general procedure of Example 1 was followed replacing the phosphoric acid with water as a foaming agent. Foam was produced having uniform small cell size and a density of 7.3 lb./ft³.

EXAMPLE 4 Preparation of Foam with Steam as Foaming Agent

The general procedure of Example 2 was followed to produce foam, however using steam as blowing agent. The steam was injected at such a rate that optimum foam production was observed, i.e. smooth flow and small cell size. The foam produced had a density of 12 lb./ft³.

EXAMPLE 5 Preparation of Foam from Aromatic Polysufide-Sulfur Mixture

A. 1 part by weight of phenol and 4 parts of sulfur placed in a reaction vessel equipped with heater and a mechanical stirrer. The mixture was heated at a temperature of 150°–160° C. for a period of about 12 hours. The product was removed from the vessel and allowed to cool in order to form an amorphous solid.

B. 28 lbs. of the product of A. and 55.7 lbs. of sulfur were placed in the reaction vessel described in Example 1, then heated to a temperature of about 145° C. 0.50 g. of $P_2S_5$ were added to the mixture, and the temperature was allowed to rise to 160° C. for about 1 hour. 3.8 lbs. of dithiodipropionic acid was added to the mixture which was allowed to stir an additional 1.5 hours at 150°–160° C. 4.5 lbs. of talc (Mistron Vapor A) was added to the mixture ad the temperature dropped to about 145° C. 0.5 lb. of Dow-Corning DC-193 silicone surfactant was added to the mixture, the vessel was pressurized to about 35 psi. The apparatus was equipped as in Example 1. As the molten mixture reached the power mixer, it was mixed with diphenylmethanediisocyanate which was forced from a tank under pressure through a rotameter. The diisocyanate addition was adjusted with the rotameter to provide a ratio of approximately equimolar amounts of isocyanate groups to the carboxylic groups present in the sulfur mixture at one time in the mixer. A foaming effluent from mixer was deposited upon the ground and allowed to cool, yielding a strong, rigid material having a density of about 10 lbs/cu.ft.

EXAMPLE 6 Preparation of Foam from Aromatic Polysulfide-Sulfur Mixture with Static Mixer The procedure of Example 5 was followed in all details with the exception that the static mixer, which was employed in Example 2, was used rather than the power-driven mixer. Compressed air at 60 psi was introduced into the transfer line at a point just "upstream" of the point at which the diisocyanate addition line was attached. The foam produced, when it cooled, was a strong, rigid material having a density of about 10 lbs. per cubic foot.

The process of this invention can be used advantageously in many applications where portability of the production unit is important. Thus, the production apparatus may be mounted on skids or on a truck bed and moved to construction site. The hoses, pipes, or other means of conveying the mixture from the first reaction zone to the second mixing zone may be of any desirable so that maximum convenience and portability may be achieved. If the distance that the conveying means (pipe or hose, etc.) is long, it will be necessary to apply insulating or heating means, or in some cases both, to the conveying means in order to maintain the sulfur-based mixture in molten form. Thus, the only limiting factors upon the distance will be the insulation and heat requirements and the power requirement to pump the material to the second zone.

The process can thus be easily used to provide foam insulation in building construction wherein the first zone (e.g., a mixing tank) can be mounted on a truck at street level and the mixture be pumped with a receptacle and lines of proper strength to the top of large buildings wherein an operator can apply the insulation.

While the process and apparatus have been described as allowing continuous generation of foam as contrasted with the single zone processes, it will often occur that interruptions of foam generation will be necessary or desirable. Such instances will occur when, for example, forms are being filled with foam and upon fill up of one form it is wished to transfer the foaming discharge to another form. It is to be understood that this can be readily accomplished by providing valves and recycle lines for both sulfur formulation and foaming agent. Such arrangement allows easy interruption of foam production while maintaining the necessary temperature control and ratio of foaming agent to sulfur formulation. Returning the recycle to the mixer immediately recommences foam production.

While the character of this invention has been described in detail with numerous examples, this has been done by way of illustration only and without limitation of the invention. It will be apparent to those skilled in the art that modifications and variations of the illustrative examples may be made in the practice of the invention within the scope of the following claims.

We claim:

1. A process for continuous production and application of sulfur-based foams which comprises the steps of:

a. heating at a temperature of 100° C to 150° C in a vessel a sulfur formulation containing at least 50% by weight sulfur and a minor amount of a gas-producing component, said formulation being heated until it is in liquid state;
b. passing said liquid state formulation at a temperature within said temperature range out of said vessel and into a mixer separate from the vessel;
c. mixing said formulation in said mixer with a foaming agent which in combination with said gas-producing component releases gas to produce a gas-containing mixture;
d. passing said gas-containing mixture from said mixer, at a rate such that the average residence time of the liquid state formulation in said mixer is between 0.1 and 3.0 seconds, to produce a cellular construction material.

2. The process of claim 1 in which the gas-producing component is an inorganic sulfide.

3. The process of claim 2 in which the gas-producing component is a phosphorus sulfide.

4. The process of claim 3 in which the phosphorus sulfide is $P_2P_5$.

5. The process of claim 2 in which the foaming agent is a proton donor.

6. The process of claim 5 in which the proton donor is steam.

7. The proces of claim 1 in which the gas-producing component is an organic acid and the foaming agent is a polyisocyanate or a polyisothiocyanate.

8. The process of claim 7 in which the organic acid is a carboxylic acid.

9. The process of claim 8 in which the acid is acrylic acid.

10. The process of claim 7 in which the foaming agent is a polyisocyanate.

11. The process of claim 10 in which the foaming agent is diphenylmethane diisocyanate.

12. The process of claim 1 in which said mixer is a power-driven mixer.

13. The process of claim 1 in which said mixer is a static mixer.

* * * * *